(12) United States Patent
Kaufmann et al.

(10) Patent No.: US 9,587,528 B2
(45) Date of Patent: Mar. 7, 2017

(54) HYDRAULIC VALVE FOR CAM PHASER

(71) Applicant: Hilite Germany GmbH, Marktheidenfeld (DE)

(72) Inventors: Dietmar Kaufmann, Tiefenthal (DE); Dietmar Schulze, Muenzenberg (DE)

(73) Assignee: Hilite Germany GmbH, Marktheidenfeld (DE)

( * ) Notice: Subject to any disclaimer, the term of this patent is extended or adjusted under 35 U.S.C. 154(b) by 142 days.

(21) Appl. No.: 14/625,946

(22) Filed: Feb. 19, 2015

(65) Prior Publication Data

US 2015/0300213 A1    Oct. 22, 2015

(30) Foreign Application Priority Data

Mar. 13, 2014   (DE) .................... 10 2014 103 400

(51) Int. Cl.
*F16K 31/06* (2006.01)
*F01L 1/344* (2006.01)
*F16K 11/10* (2006.01)

(52) U.S. Cl.
CPC ............. *F01L 1/3442* (2013.01); *F01L 1/344* (2013.01); *F16K 11/10* (2013.01); *F16K 31/0613* (2013.01); *F01L 2001/3443* (2013.01); *F01L 2001/34423* (2013.01); *F01L 2001/34426* (2013.01); *F01L 2001/34456* (2013.01); *F01L 2001/34469* (2013.01); *F01L 2250/02* (2013.01); *F01L 2250/04* (2013.01); *Y10T 137/86831* (2015.04)

(58) Field of Classification Search
CPC ... F16K 31/0613; F01L 1/344; F01L 2250/02; Y10T 137/86831

USPC .................................................... 137/625.42
See application file for complete search history.

(56) References Cited

U.S. PATENT DOCUMENTS

| | | | |
|---|---|---|---|
| 8,225,818 B1 * | 7/2012 | Stephens ............. | F15B 13/0402 137/512.15 |
| 2003/0196618 A1 * | 10/2003 | Simpson ................ | F01L 1/344 123/90.15 |

(Continued)

FOREIGN PATENT DOCUMENTS

| | | |
|---|---|---|
| DE | 102010005604 | 7/2011 |
| EP | 2466081 | 6/2012 |

(Continued)

*Primary Examiner* — Michael R Reid
*Assistant Examiner* — Christopher Ballman
(74) *Attorney, Agent, or Firm* — Von Rohrscheidt Patents

(57) ABSTRACT

A hydraulic valve, in particular for a cam phaser of a cam shaft, the hydraulic valve including a supply connection with a check valve for supplying a hydraulic fluid; at least one first operating connection and a second operating connection; at least one first tank outlet and a second tank outlet for draining the hydraulic fluid; a piston that is moveable in a bore hole along a longitudinal direction of the bore hole for distributing the hydraulic fluid from the supply connection to the first operating connection and/or the second operating connection and for conducting the hydraulic fluid from the first operating connection to the second operating connection and from the first operating connection to the first tank outlet and/or from the second operating connection to the second tank outlet; and a sleeve that is arranged in the piston moveable relative to the piston in the longitudinal direction.

11 Claims, 4 Drawing Sheets

(56) References Cited

U.S. PATENT DOCUMENTS

| | | | |
|---|---|---|---|
| 2005/0252561 A1* | 11/2005 | Strauss | F01L 1/022 137/625.68 |
| 2009/0159024 A1* | 6/2009 | Paul | F01L 1/34409 123/90.15 |
| 2010/0326385 A1* | 12/2010 | Busse | F01L 1/3442 123/90.17 |
| 2011/0266479 A1* | 11/2011 | Gautier | F01L 1/3442 251/282 |
| 2011/0309281 A1* | 12/2011 | Hoppe | F01L 1/34 251/324 |
| 2012/0152195 A1* | 6/2012 | Schulze | F01L 1/34409 123/90.17 |
| 2014/0311594 A1* | 10/2014 | Hutzelmann | F16K 17/105 137/490 |

FOREIGN PATENT DOCUMENTS

| | | |
|---|---|---|
| EP | 2796673 | 10/2014 |
| JP | 2012122457 A | 6/2012 |
| WO | WO2008067935 A2 | 6/2008 |
| WO | WO2009138153 A1 | 11/2009 |

* cited by examiner

HYDRAULIC VALVE FOR CAM PHASER

RELATED APPLICATIONS

This application claims priority from and incorporates by reference German patent application DE 10 2014 103 400.7 filed on Mar. 13, 2014.

FIELD OF THE INVENTION

The invention relates to a hydraulic valve in particular for a cam phaser of an internal combustion engine of a motor vehicle.

BACKGROUND OF THE INVENTION

WO 2009/13 81 53 A1 discloses a hydraulic valve in particular of a cam phaser with a first check valve arranged in an operating medium inflow and a second check valve arranged between two operating medium connections. The two check valves include a common moveable valve element like e.g. a common valve body, a common valve spring, and a common stop device. Thus, providing double valve elements which are necessary for the check valves can be omitted which implements a simple and compact configuration for the hydraulic valve. Thus, the hydraulic valve includes a valve element configured as valve spring for two blocking elements which facilitates omitting a second valve spring. The valve spring is integrally configured for both check valves. The hydraulic valve furthermore includes a valve element configured as a stop device which limits opening travels of the check valves. Thus, the stop device is integrally configured in one piece for both check valves.

BRIEF SUMMARY OF THE INVENTION

Thus, it is an object of the present invention to provide a hydraulic valve which provides a simple and compact configuration and good control properties for a cam phaser.

Thus, it is another object of the invention to provide a cam phaser for a cam shaft which has a simple and compact configuration and good control properties.

The object is achieved by a hydraulic valve, in particular for a cam phaser of a cam shaft, the hydraulic valve including a supply connection with a check valve for supplying a hydraulic fluid; at least one first operating connection and a second operating connection; at least one first tank outlet and a second tank outlet for draining the hydraulic fluid; a piston that is moveable in a bore hole along a longitudinal direction of the bore hole for distributing the hydraulic fluid from the supply connection to the first operating connection and/or the second operating connection and for conducting the hydraulic fluid from the first operating connection to the second operating connection and from the first operating connection to the first tank outlet and/or from the second operating connection to the second tank outlet; and a sleeve that is arranged in the piston moveable relative to the piston in the longitudinal direction, wherein a first fluid path from the first operating connection to the second tank outlet is controlled by a movement of a sleeve in the longitudinal direction caused by a pressure difference of the hydraulic fluid in the supply connection and at the first operating connection.

Advantageous embodiments and advantages of the invention can be derived from the dependent claims, the description and the drawing figure.

A hydraulic valve is proposed, in particular for a cam phaser of a cam shaft, the hydraulic valve including a supply connection with a check valve for supplying a hydraulic fluid, at least one first operating connection and at least one second operating connection, and at least one first tank outlet and at least one second tank outlet for draining the hydraulic fluid. Furthermore the hydraulic valve includes a piston that is moveable along a longitudinal direction of a bore hole for distributing the hydraulic fluid from the supply connection to the first operating connection and/or the second operating connection and for conducting the hydraulic fluid from the first operating connection to the second operating connection and from the first operating connection to the first tank outlet and/or from the second operating connection to the second tank outlet and a sleeve that is arranged in the piston moveable relative to the piston in the longitudinal direction.

According to the invention a first fluid path from the first operating connection to the second tank outlet is controlled by a movement of the sleeve in the longitudinal direction caused by a pressure differential of the hydraulic fluid in the supply connection and at the first operating connection.

It is advantageous for the hydraulic valve described supra that the hydraulic valve can switch self-acting between a passive mode driven by cam switching torques into an active mode driven by a pressure of the hydraulic fluid and back again. This switching caused by the sleeve that is arranged in the piston and moveable relative to the piston in the longitudinal direction is performed as a function of a pressure difference between the supply pressure of the hydraulic fluid and the chamber pressure of the pressure chamber that is to be emptied. As long as a cam switching torque in the desired direction and with sufficient magnitude is provided the valve operates in passive mode according to the principle of a hydraulic free-wheeling clutch. Thus, no tank return of the hydraulic fluid is provided. The supply connection is thus only used for compensating a leakage of the hydraulic fluid out of the pressure chamber. When the desired cam switching torque undercuts the useable range the hydraulic valve switches into the active mode in a self-acting manner. Thus, the pressure chamber to be emptied is automatically opened in a direction towards the tank outlet and the other pressure chamber is filled through the supply connection. This quick shifting function and the switching function of the hydraulic valve are completely integrated in the piston. This helps to obtain a high power of the hydraulic valve and thus of the associated cam phaser. The hydraulic fluid requirement is almost as low as for cam phasers with purely passive control properties through the cam switching torques.

In an advantageous embodiment the sleeve can be configured as a tube that is open on one side with a base and with an opening towards the first operating connection and with an opening towards the second tank drain. This way the sleeve is moveable with the pressure of the hydraulic fluid in the longitudinal direction and can respectively open and close the first operating connection and the second tank drain of the cam phaser through the two openings.

Advantageously the sleeve can be loaded at the closed base of the sleeve with a pressure of the hydraulic fluid from the first operating connection on an inside of the sleeve and the sleeve can be loaded with the pressure of the hydraulic fluid from the supply connection on an outside of the sleeve. This can cause a longitudinal movement of the sleeve of the piston in the hydraulic valve through a pressure change of the hydraulic fluid.

Advantageously the first fluid path can extend from the first operating connection to the second tank outlet at least partially in an interior of the sleeve. Thus, the sleeve can cause a control of the first fluid path from the first operating connection to the second tank outlet advantageously and effectively so that switching from one mode of the cam phaser into another mode can be performed quickly.

In an advantageous embodiment a first operating position of the sleeve can be provided in which the second tank drain is closed and a second operating position can be provided in which the second tank drain is open. This way the passive mode of the associated cam phaser and also the active mode can be effectively implemented and furthermore a switching between both modes can be performed very quickly.

In another advantageous embodiment the base of the sleeve can close an infeed to the supply connection in the first operating position tightly. Thus, no additional valve element is required to perform switching between the passive mode into the active mode of the cam phaser.

Thus, advantageously a spring can be provided to support the sleeve in the first operating position when a pressure of the hydraulic fluid drops. This way small pressure variations of the hydraulic fluid can be compensated so that control properties of the hydraulic valve can thus be configured stable.

Advantageously the first fluid path from the first operating connection to the second tank drain can be open and a second fluid path from the supply connection to the second operating connection can be open when a pressure of the hydraulic fluid at the first operating connection is smaller than a pressure in the supply connection. This way the passive mode of the cam phaser can be advantageously implemented.

However, the active mode of the cam phaser can be implemented in that the first fluid path from the first operating connection to the second tank outlet is closed and a third fluid path from the first operating connection to the second operating connection is open and the check valve at the supply connection is closed when a pressure of the hydraulic fluid at the first operating connection is greater than a pressure in the supply connection. This facilitates stable controlled properties of the hydraulic valve with a quick switching option between both modes of the cam phaser.

According to another aspect the invention relates to a cam phaser including a hydraulic valve according to one of the preceding claims, wherein a first operating connection is connected with a first pressure chamber of the cam phaser and a second operating connection is connected with a second pressure chamber of the cam phaser. Thus, the hydraulic valve controls a fluid path from the first operating connection to a second tank outlet as a function of the pressure difference of the hydraulic fluid in a supply connection and at the first operating connection. This facilitates implementing a high power of the cam phaser. The hydraulic fluid requirement is thus almost as low as for cam phasers with purely passive control properties based on cam switching torques.

BRIEF DESCRIPTION OF THE DRAWINGS

Further advantages can be derived from the subsequent drawing description. The drawings illustrate embodiments of the invention. The drawings, the description and the claims include numerous features in combination. A person skilled in the art will advantageously consider the features also individually and combine them into additional advantageous combinations, wherein;

DETAILED DESCRIPTION OF THE INVENTION

Figure 1:
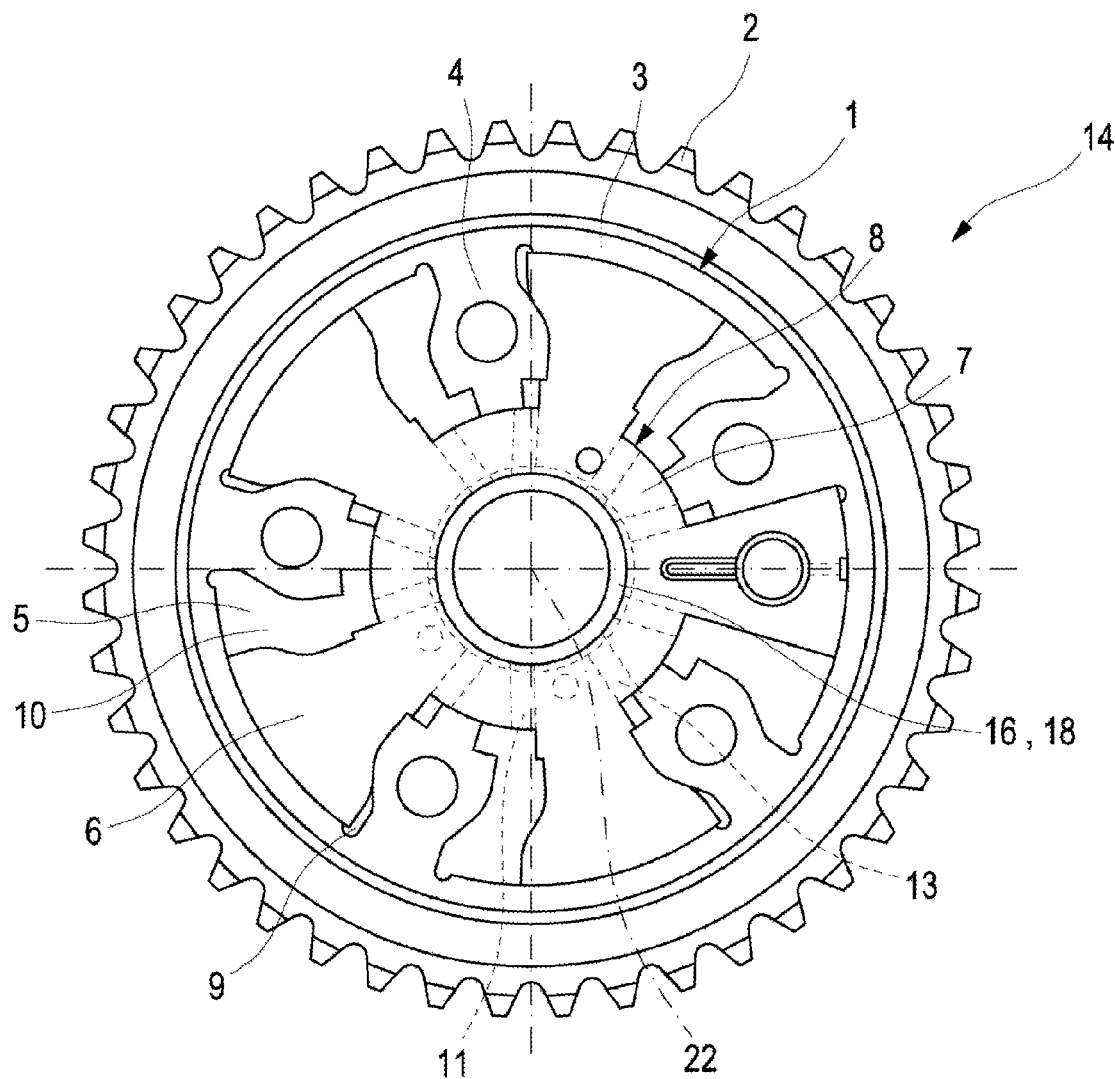
FIG. 1 illustrates a sectional view of a prior art cam phaser.

In the figures identical or equivalent components are designated with identical reference numerals. The figures only illustrate exemplary embodiments and do not limit the scope of the invention.

A prior art cam phaser 14 according to FIG. 1 continuously changes an angular position of a cam shaft 18 relative to a drive gear 2 during operations of an internal combustion engine. A relative rotation of the cam shaft 18 moves opening and closing times of gas control valves so that the internal combustion delivers optimum power at a respective speed.

The cam phaser 14 includes a cylindrical stator 1 which is connected torque proof with the drive gear 2. In the illustrated embodiment the drive gear 2 is a chain sprocket over which a chain is run that is not illustrated in more detail. The drive gear 2 can also be a timing belt cog over which a timing belt is run as a drive element. The stator 1 is drive connected with the crank shaft through the drive element and the drive gear 2.

The stator 1 includes a cylindrical stator base element 3 at whose inside bars 4 radially protrude inward with uniform spacing from each other. Intermediary spaces 5 are formed between adjacent bars 4 into which hydraulic fluid is introduced controlled by a hydraulic valve 12 illustrated in FIG. 2. The hydraulic valve 12 is thus configured as a non central valve, but it can also be configured as a central valve in an embodiment. Between adjacent bars 4 blades 6 are arranged which extend radially outward from a cylindrical rotor hub 7 of a rotor 8. The blades 6 subdivide the intermediary spaces 5 between the bars 4 respectively into two pressure chambers 9, 10.

The bars 4 contact an outer enveloping surface of the rotor hub 7 with their faces in a sealing manner. The blades 6 in turn contact the cylindrical inner wall of the stator base element 3 in a sealing manner.

The rotor 8 is connected torque proof with the cam shaft 18. In order to change an angular position of the cam shaft 18 relative to the drive gear 2 the rotor 8 is rotated relative to the stator 1. Thus the hydraulic fluid in the pressure chambers 9 and 10 is pressurized as a function of the desired direction of rotation, whereas the respective other pressure chambers 10 or 9 are unloaded towards the tank of the hydraulic fluid. In order to pivot the rotor 8 relative to the stator 1 counter clock wise into the illustrated position the hydraulic valve 12 pressurizes an annular first rotor channel in the rotor hub 7. From this first rotor channel additional channels 11 lead into the pressure chambers 10. This first rotor channel is associated with the first operating connection 34. In order to pivot the rotor 8 clockwise the hydraulic valve 12 pressurizes a second rotor channel in the rotor hub 7. The second rotor channel is associated with the second operating connection 36. The two rotor channels are arranged axially offset from one another with respect to a central axis 22.

The cam phaser 14 is placed onto the cam shaft 18 that is configured as a hollow tube 16. For this purpose the rotor 8 is slid onto the cam shaft 18. The cam phaser 14 is pivotable by the hydraulic valve 12 illustrated in FIG. 2.

The phaser 14 of a cam shaft 18 includes a hydraulic valve 10 according to the invention, wherein a first operating connection 34 is connected with a first pressure chamber 9 of the cam phaser 14 and a second operating connection 36 is connected with the second pressure chamber 10 of the cam phaser 14. Thus, the hydraulic valve 12 controls a fluid path 52 from the first operating connection 34 to a second tank outlet 40 as a function of a pressure difference of the hydraulic fluid in a supply connection 30 and at the first operating connection 34.

Figure 2:
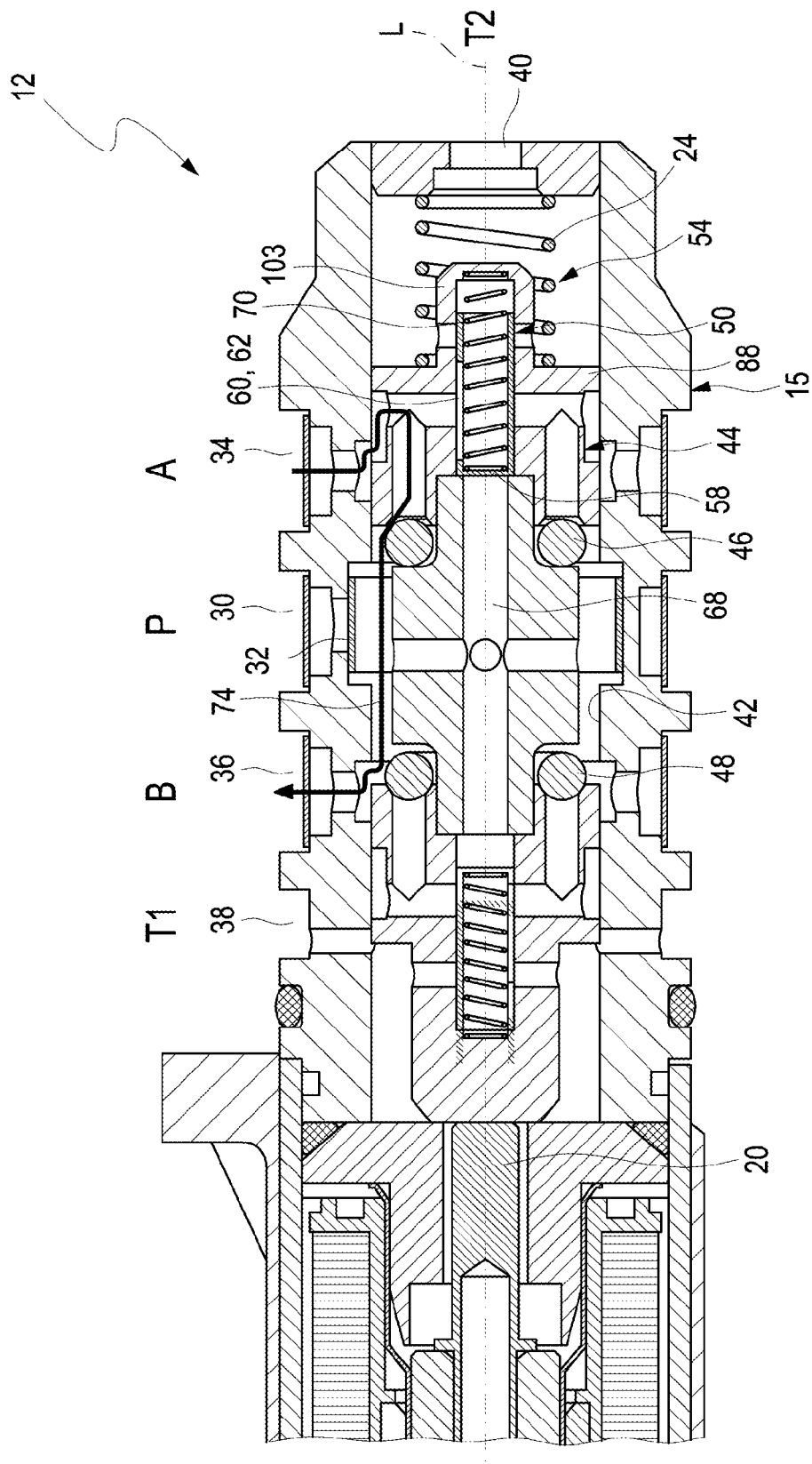
FIG. 2 illustrates a sectional view of a hydraulic valve for adjusting a cam phaser according to an embodiment of the invention in a first operating position.

FIG. 2 illustrates a sectional view through a hydraulic valve 12 for adjusting a cam phaser 14, in particular of a cam shaft 18 according to an embodiment of the invention in a first operating position 54.

Within the hollow tube 16 in FIG. 1 a bushing 15 associated with the hydraulic valve is coaxially inserted. A hollow piston 44 that is moveable against a force of a compression coil spring 24 is supported axially moveable in a center borehole 42 of the bushing 15. Thus, the compression coil spring 24 is supported on one side at the piston 44 and on the other side at the housing. As a stop for the compression coil spring 24 a shoulder 88 is provided within the piston 44 wherein a radial spring support 103 adjoins at the end of the piston 44. A plunger 20 of an electromagnetic actuator contacts the piston 44 at an end of the bushing 15 oriented towards an outside of the cam shaft, this means a rear end of the bushing 15, wherein the electromagnetic actuator facilitates moving the piston 44 in the longitudinal direction L to perform a hydraulic control function. Additionally two annular check valves 46 and 48 are arranged at the piston 44, wherein the check valves move in a longitudinal direction L as a function of a pressure of the hydraulic fluid in the operating connections 34 and 36 and a pressure in the supply connection 30.

The hydraulic valve 12 includes a supply connection 30 with a check valve 32 for supplying a hydraulic fluid, a first operating connection 34 and a second operating connection 36 and a first tank outlet 38 and a second tank outlet 40 for draining the hydraulic fluid. Additionally the hydraulic valve 12 includes a piston 44 that is inserted longitudinally moveable along a longitudinal direction L for distributing the hydraulic fluid from the supply connection 30 to the first operating connection 34 and/or the second operating connection 36 and for conducting the hydraulic fluid from the first operating connection 34 to the second operating connection 36 and from the first operating connection 34 to the first tank outlet 38 and/or from the second operating connection 36 onto the second tank outlet 40.

Furthermore the hydraulic 12 includes a sleeve 50 that is arranged longitudinally moveable in the piston 44. The sleeve 50 controls a first fluid path 52 from the first operating connection 34 to the second tank outlet 40 through a movement of the sleeve 50 in the longitudinal direction L caused by a pressure difference of the hydraulic fluid in the supply connection 30 and at the first operating connection 34. The sleeve 50 is configured as a tube that is open on one side with a base 58 and an opening 60 towards the first operating connection 34 and an opening 62 towards the second tank outlet 40. As illustrated in FIG. 2 the two openings 60 and 62 can be configured as a single opening. This way the sleeve 50 is moveable in the longitudinal direction L by the pressure of the hydraulic fluid and can respectively open and close the first operating connection 34 and the second tank outlet 40 of the cam phaser through the two openings 60, 62. Thus, the sleeve 50 can advantageously and effectively control the first fluid path 52 from the first operating connection 34 to the second tank outlet 40, so that the switching from one mode of the cam phaser 14 into another mode can be performed quickly. The sleeve 50 can be loaded at the closed base 58 with the pressure of the hydraulic fluid from the first operating connection 34 on an inside 64 of the sleeve 50 and with the pressure of the hydraulic fluid from the supply connection 30 on an outside 66 of the sleeve 50 through the feed conduit 68. A first operating position 54 of the sleeve 50 is provided in which the second tank outlet 40 is closed and a second operating position 56 is provided in which the second tank outlet 40 is open. The base 58 of the sleeve 50 closes an infeed 68 to the supply connection 30 in the first operating position 54 tightly. A spring 70 is provided to retain the sleeve 50 in the first operating position 54 when the pressure of the hydraulic fluid drops. This way pressure variations of the hydraulic fluid can be compensated so that control properties of the hydraulic valve 12 are stable.

FIG. 2 illustrates the hydraulic valve 12 in the first operating position 54. When the pressure of the hydraulic fluid at the first operating connection 34 is greater than the pressure in the supply connection 30 the first fluid path 52 from the first operating connection 34 to the second tank outlet 40 (explicitly illustrated in FIG. 3) is closed, whereas a third fluid path 74 from the first operating connection 34 to the second operating connection 36 is open. A second fluid path 72 from the supply connection 30 to the second operating connection 35 (explicitly illustrated in FIG. 3) is closed by the check valve 32 at the supply connection 30.

Figure 3:
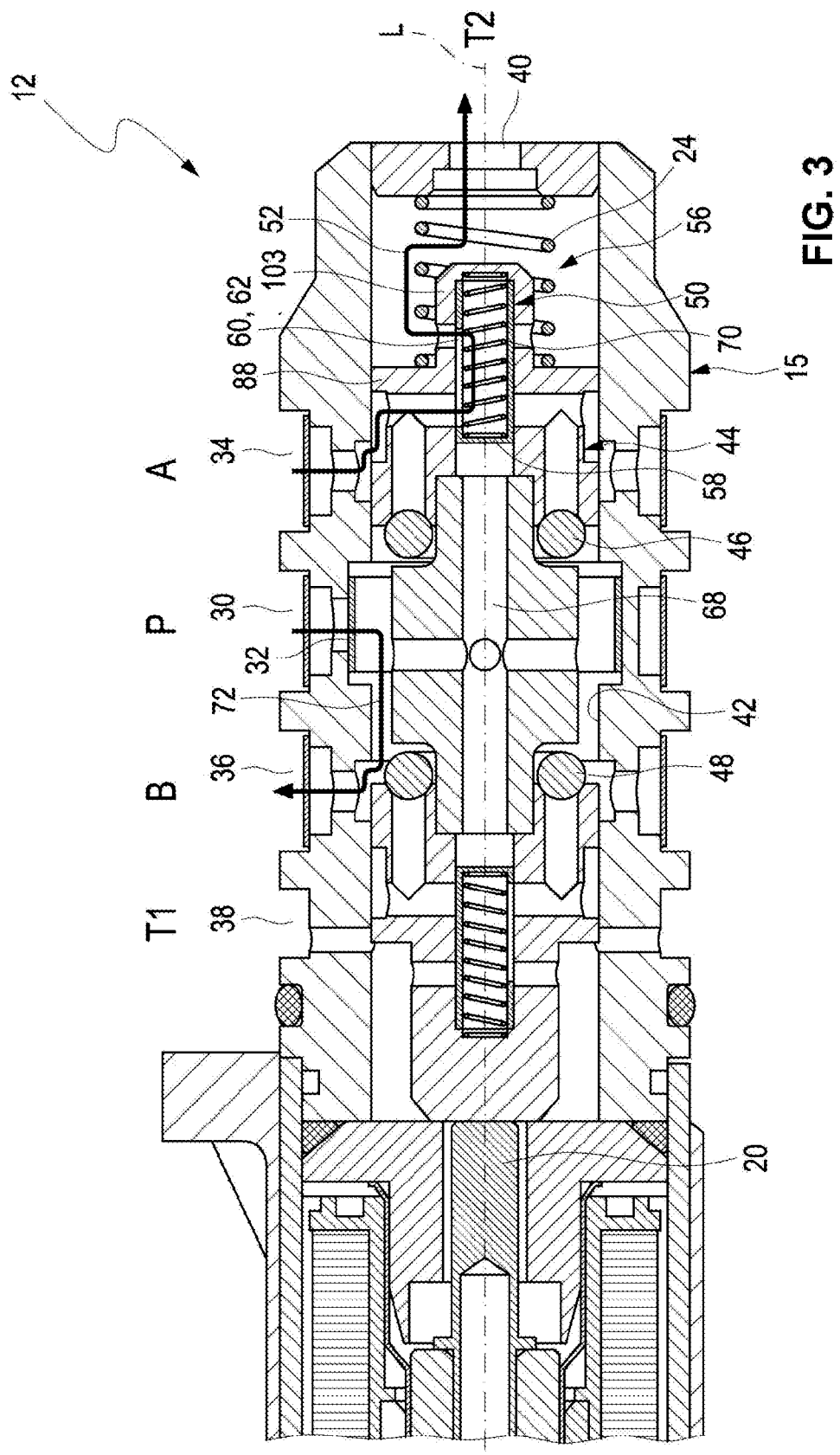
FIG. 3 illustrates a sectional view of a hydraulic valve for adjusting a cam phaser according to the embodiment of the invention according to FIG. 2 in a second operating position.

FIG. 3 illustrates another sectional view of the hydraulic valve 12 for adjusting the cam phaser 14 according to the embodiment of the invention according to FIG. 2 in a second operating position 56.

The first fluid path 52 extends from the first operating connection 34 to the second tank outlet 40 at least in portions in an interior of the sleeve 50. When the pressure of the hydraulic fluid at the first operating connection 34 is smaller than a pressure in the supply connection 30 the first fluid path 52 from the first operating connection 34 to the second tank outlet 40 is open and a second fluid path 72 from the supply connection 30 to the second operating connection 36 is also open. Thus, the sleeve 50 has been pushed into the second operating position 56 by the pressure of the hydraulic fluid through the infeed 68 which compresses the spring 70 so that the hydraulic fluid can flow from the first operating connection 34 through the openings 60, 62 through the interior of the sleeve to the tank outlet 40.

Figure 4:
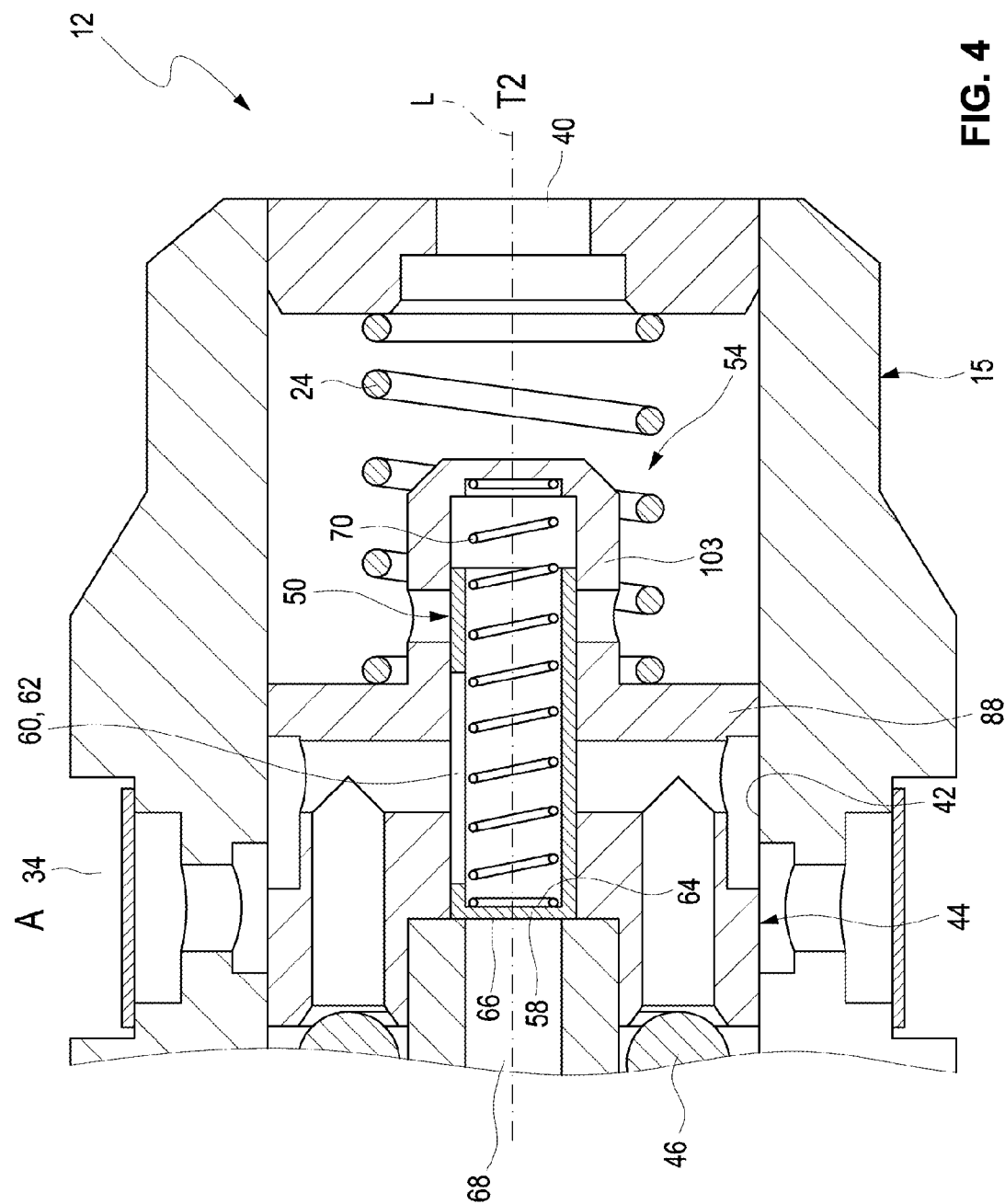
FIG. 4 illustrates a sectional view of a detail of a sleeve of a hydraulic valve according to an embodiment of the invention according to FIG. 2.

FIG. 4 illustrates a sectional view of a detail of a hydraulic valve 12 according to the embodiment of the invention according to FIG. 2. The sleeve 50 is in the first operating position 54 and pushed by the spring 70 against a stop at a low pressure of the hydraulic fluid in the supply connection 30 which is furthermore supported by the pressure on an inside 64 of the sleeve 50 against the base 58. The pressure on the outside 66 of the sleeve 50 through the infeed 68 is thus lower than a pressure on an inside 64 so that the base 58 of the sleeve 50 closes the infeed 68 tight. The second tank outlet 40 is closed towards the inside 64 of the sleeve 50 in this first operating position 54.

What is claimed is:

1. A hydraulic valve for a cam phaser of a cam shaft, the hydraulic valve comprising:
   a supply connection with a check valve for supplying a hydraulic fluid;
   at least one first operating connection and a second operating connection;
   at least one first tank outlet and a second tank outlet for draining the hydraulic fluid;
   a piston that is moveable in a bore hole along a longitudinal direction of the bore hole distributing the hydraulic fluid from the supply connection to at least one of the at least one first operating connection and the second operating connection and conducting the hydraulic fluid from the at least one first operating connection to the second operating connection and from the at least one first operating connection to the at least one first tank outlet
or from the second operating connection to the second tank outlet; and
   a sleeve that is arranged in the piston moveable relative to the piston in the longitudinal direction,
   wherein a first fluid path from the at least one first operating connection to the second tank outlet is controlled by a movement of the sleeve in the longitudinal direction caused by a pressure difference of the hydraulic fluid in the supply connection and at the at least one first operating connection.

2. The hydraulic valve according to claim 1, wherein the sleeve is configured as a tube that is open on one side and that includes a base and an opening towards the at least one first operating connection and an opening towards the second tank outlet.

3. The hydraulic valve according to claim 1,
   wherein the sleeve is loadable at a closed base of the sleeve with a pressure of the hydraulic fluid from the at least one first operating connection on an inside of the sleeve and with a pressure of the hydraulic fluid from the supply connection on an outside of the sleeve through a feed conduit.

4. The hydraulic valve according to claim 1, wherein the first fluid path from the at least one first operating connection to the second tank outlet extends at least partially in an interior of the sleeve.

5. The hydraulic valve according to claim 1,
   wherein a first operating position of the sleeve is provided in which the second tank outlet is closed, and
   wherein a second operating position of the sleeve is provided in which the second tank outlet is open.

6. The hydraulic valve according to claim 5, wherein a base of the sleeve closes an infeed towards the supply connection tight in the first operating position.

7. The hydraulic valve according to claim 5, wherein a spring is provided which supports the sleeve in the first operating position when a pressure of the hydraulic fluid decreases.

8. The hydraulic valve according to claim 1, wherein the first fluid path from the at least one first operating connection to the second tank outlet is open and a second fluid path from the supply connection to the second operating connection is open when a pressure of the hydraulic fluid at the at least one first operating connection is smaller than a pressure at the supply connection.

9. The hydraulic valve according to claim 1,
   wherein the first fluid path from the at least one first operating connection to the second tank outlet is closed and a third fluid path from the at least one first operating connection to the second operating connection is open and the check valve at the supply connection is closed when a pressure of the hydraulic fluid at the at least one first operating connection is greater than a pressure at the supply connection.

10. A cam phaser for a cam shaft, the cam phaser comprising:
    the hydraulic valve according to claim 1,
    wherein the at least one first operating connection is connected with a first pressure chamber of the cam phaser and the second operating connection is connected with a second pressure chamber of the cam phaser,
    wherein the hydraulic valve controls the first fluid path from the at least one first operating connection to the second tank outlet as a function of the pressure difference of the hydraulic fluid in the supply connection and at the at least one first operating connection.

11. A hydraulic valve for a cam phaser of a cam shaft, the hydraulic valve comprising:
    a supply connection with a check valve for supplying a hydraulic fluid;
    at least one first operating connection and a second operating connection;
    at least one first tank outlet and a second tank outlet for draining the hydraulic fluid;
    a piston that is moveable in a bore hole along a longitudinal direction of the bore hole distributing the hydraulic fluid from the supply connection to the at least one first operating connection and the second operating connection and for conducting the hydraulic fluid from the at least one first operating connection to the second operating connection
    and from the at least one first operating connection to the first tank outlet and from the second operating connection to the second tank outlet; and
    a sleeve that is arranged in the piston moveable relative to the piston in the longitudinal direction,
    wherein a first fluid path from the at least one first operating connection to the second tank outlet is controlled by a movement of the sleeve in the longitudinal direction caused by a pressure difference of the hydraulic fluid in the supply connection and at the at least one first operating connection.

* * * * *